United States Patent
Schwille et al.

(10) Patent No.: US 11,998,164 B2
(45) Date of Patent: Jun. 4, 2024

(54) SYSTEM FORMED OF SUCTION DEVICE AND HAND-HELD POWER TOOL, AND METHOD FOR OPERATING THE SYSTEM

(71) Applicant: Robert Bosch GmbH, Stuttgart (DE)

(72) Inventors: Matthias Christian Schwille, Tuebingen (DE); Christian Pieper, Herrenberg (DE); Jana Bieser, Ludwigsburg (DE); Ruggero Indino, Nufringen (DE); Philippe Van Den Bogaert, Korntal (DE); Holger Alexander Doeppner, Reutlingen (DE); Nils Donath, Stuttgart (DE); Michael Wall, Stuttgart (DE); Christopher Michael Barker, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 774 days.

(21) Appl. No.: 17/255,135

(22) PCT Filed: Jun. 17, 2019

(86) PCT No.: PCT/EP2019/065895
§ 371 (c)(1),
(2) Date: Jun. 11, 2021

(87) PCT Pub. No.: WO2020/002029
PCT Pub. Date: Jan. 2, 2020

(65) Prior Publication Data
US 2021/0353121 A1 Nov. 18, 2021

(30) Foreign Application Priority Data
Jun. 29, 2018 (DE) ..................... 10 2018 210 682.7

(51) Int. Cl.
*A47L 9/28* (2006.01)
*A47L 7/00* (2006.01)
(Continued)

(52) U.S. Cl.
CPC ........... *A47L 9/2894* (2013.01); *A47L 7/0095* (2013.01); *A47L 9/246* (2013.01); *A47L 9/2805* (2013.01);
(Continued)

(58) Field of Classification Search
CPC ............................... A47L 7/0095; A47L 9/246
See application file for complete search history.

(56) References Cited

U.S. PATENT DOCUMENTS

| 5,237,896 A | 8/1993 | Albright et al. |
| 6,044,519 A | 4/2000 | Hendrix |

(Continued)

FOREIGN PATENT DOCUMENTS

| CN | 1486797 A | 4/2004 |
| CN | 2820458 Y | 9/2006 |

(Continued)

OTHER PUBLICATIONS

International Search Report corresponding to PCT Application No. PCT/EP2019/065895, dated Nov. 7, 2019 (German and English Language Documents) (7 pages).

*Primary Examiner* — Andrew A Horton
(74) *Attorney, Agent, or Firm* — Maginot, Moore & Beck LLP (57) ABSTRACT

The disclosure relates to a method for operating a system that includes at least one suction device and at least one hand-held power tool. The method includes establishing a communications link between the suction device and the hand-held power tool by means of at least one suction device communication unit and at least one hand-held power tool (Continued)

communication unit, and transmitting at least one communication signal by means of the communications link from the hand-held power tool, in particular the hand-held power tool communication unit, to the suction device, in particular the suction device communication unit. When the suction device is switched on, at least one start signal is sent to the hand-held power tool, the hand-held power tool being activatable only if the start signal is received by the hand-held power tool.

19 Claims, 5 Drawing Sheets

(51) Int. Cl.
*A47L 9/24* (2006.01)
*B23Q 11/00* (2006.01)
(52) U.S. Cl.
CPC ........... *A47L 9/2842* (2013.01); *A47L 9/2857* (2013.01); *B23Q 11/0046* (2013.01); *B23Q 11/0071* (2013.01)

(56) References Cited

U.S. PATENT DOCUMENTS

| | | |
|---|---|---|
| 2008/0022479 A1 | 1/2008 | Zhao |
| 2010/0199453 A1 | 8/2010 | Brotto et al. |
| 2012/0073077 A1* | 3/2012 | Ishikawa ............... A47L 9/2857 15/347 |
| 2014/0008087 A1 | 1/2014 | Brown et al. |

FOREIGN PATENT DOCUMENTS

| | | |
|---|---|---|
| CN | 202078264 U | 12/2011 |
| CN | 103128719 A | 6/2013 |
| CN | 103567990 A | 2/2014 |
| DE | 10 2012 003 076 A1 | 8/2013 |
| DE | 10 2012 003 077 A1 | 8/2013 |
| DE | 10 2014 005 222 A1 | 10/2014 |
| EP | 3 272 261 A2 | 1/2018 |
| JP | 2001-179705 A | 7/2001 |
| JP | 2005-102791 A | 4/2005 |

* cited by examiner

SYSTEM FORMED OF SUCTION DEVICE AND HAND-HELD POWER TOOL, AND METHOD FOR OPERATING THE SYSTEM

This application is a 35 U.S.C. § 371 National Stage Application of PCT/EP2019/065895, filed on Jun. 17, 2019, which claims the benefit of priority to Serial No. DE 10 2018 210 682.7, filed on Jun. 29, 2018 in Germany, the disclosures of which are incorporated herein by reference in their entirety.

The present disclosure relates to a method for operating a system, wherein the system comprises at least one suction device and at least one hand-held power tool.

BACKGROUND

A system comprising at least one suction device and at least one hand-held power tool is already known from DE 10 2012 003 076 A1. The suction device comprises a suction device communication means for communication with the hand-held power tool. For this purpose the hand-held power tool has an external communication means.

SUMMARY

The present disclosure is based on a method for operating a system, wherein the system comprises at least one suction device and at least one hand-held power tool. A communication link is established between the suction device and the hand-held power tool by means of at least one suction-device communication unit and at least one hand-held power tool communication unit. Further, at least one communication signal is transmitted, by means of the communication link, from the hand-held power tool, in particular the hand-held power tool communication unit, to the suction device, in particular the suction-device communication unit. It is proposed that, upon the suction device being switched on, at least one start signal is sent to the hand-held power tool. The hand-held power tool can be activated only if the start signal is received by the hand-held power tool.

The disclosure provides a method for operating the system, comprising the suction device and the hand-held power tool, in order to enhance work safety. The work safety is enhanced, in particular, by the fact that the hand-held power tool can only be activated when the start signal is received from the hand-held power tool. This is particularly the case if, for example, a hammer drill, a hand-held circular saw or other hand-held power tools that generate dust and/or dirt particles, such as those known from the prior art, are used as the hand-held power tool. In this case, dust and/or dirt particles generated by the use of the hand-held power tool are directly and immediately extracted by the suction device.

In a manner known per se the suction device has, in particular, a suction-device housing, a suction-device power supply, at least one suction hose and a dust collection device.

The suction-device housing may comprise at least one suction-device mains socket. In addition, the suction-device housing may have at least one suction-device operating unit and at least one suction-device holding unit.

The suction-device mains socket is at least one mains socket of the suction device, and is arranged on the suction-device housing. The at least one mains socket of the suction device is designed to supply power to a connected electrical device or a connected hand-held power tool when the suction device itself is supplied with power.

The suction-device operating unit comprises at least one suction-device operating element that is designed to be operated by a user and to generate switching signals. The switching signals may then control a suction-device drive unit. The suction-device operating element may be arranged on a side of the suction-device housing. Suction-device operating elements may be, for example, a main switch or a setting switch. The main switch is designed at least to switch the suction-device operating unit on and off. The setting switch is designed at least to set a suction power of the suction device. The suction device holding unit comprises at least one suction-device holding element, for example a suction-device handle, with which the user can hold the suction device. In addition, there may be at least one suction-device movement unit attached to the suction-device housing, such that the suction device is expediently a mobile suction device. The suction-device movement unit is realized as at least one castor, at least one wheel or the like, so that it can be moved on a surface. Preferably, the mobile suction device is designed as a portable suction device having castors, wheels or the like, or alternatively having no castors, wheels or the like. In the context of the present disclosure, the user takes along the suction device and uses it directly at a desired operating site.

The suction-device power supply unit is a power supply unit of the suction device. The suction-device power supply unit supplies the suction device with electrical energy. The suction device in this case may be realized as a battery-operated suction device or, alternatively, as a mains-operated suction device.

The battery-operated suction device can be operated by means of at least one rechargeable battery, in particular by means of a hand-held power tool battery pack. This then enables the suction-device power supply unit to supply the power by means of the at least one rechargeable battery. In the context of the present disclosure, a "hand-held power tool battery pack" is to be understood to mean an assembly of at least one battery cell and a battery-pack housing. The hand-held power tool battery pack is advantageously designed for supplying power to commercially available battery-operated hand-held power tools. The at least one battery cell may be realized, for example, as a Li-ion battery cell having a nominal voltage of 3.6 V. For example, the hand-held power tool battery pack comprises at least five battery cells and has a total nominal operating voltage of 18 V to enable the suction device to be operated in accordance with its power rating.

The mains-operated suction device can be connected to an external mains socket by means of an electric power supply cable. This then enables the suction-device power supply unit to supply the power by means of a mains voltage. The external mains socket may provide a mains voltage of, for example, 100 V, 110 V, 120 V, 127 V, 220 V, 230 V or 240 V, at 50 Hz or 60 Hz, but also a three-phase alternating voltage. The possible designs of the external mains socket and the associated available mains voltages are sufficiently known to persons skilled in the art.

The suction hose has at least one suction opening and can preferably be detachably attached to the suction-device housing. The suction opening is designed to pick up generated particles, in particular dust and/or dirt particles, by means of a suction current during operation of the suction device. In addition, the suction hose can be connected to the hand-held power tool, preferably detachably. The suction hose in this case is designed to remove the particles generated during operation of the hand-held power tool, in particular dust and/or dirt particles, from a work surface, a work region or a work area of the hand-held power tool, via the suction opening. The suction device is operated to remove generated particles, in particular dust and/or dirt particles, by means of the suction hose. Via the suction hose, the generated particles, in particular the dust and/or dirt particles, are conveyed to the dust collection device of the suction device, in a manner known per se.

In the context of the present disclosure, a "hand-held power tool" is to be understood to mean, in particular, a manually guided power tool, preferably a battery-powered hand-held power tool. However, a mains-operated or pneumatically operated hand-held power tool is also conceivable. In a manner known per se, the hand-held power tool comprises a hand-held power tool housing, a drive unit and a hand-held power tool power supply unit.

The hand-held power tool housing accommodates the drive unit. The drive unit comprises at least one drive motor and may, in one embodiment, have at least one transmission. The drive motor may realized, in particular, as at least one electric motor. The transmission may be realized as at least one planetary gearing, and may be, for example, a shiftable gearing. The disclosure may also be applied to other types of motors or transmissions. In addition, the hand-held power tool comprises the hand-held power tool power supply unit, the hand-held power tool power supply unit being designed for a preferred battery operation by means of rechargeable batteries, in particular hand-held power tool battery packs, and/or for mains operation.

The communication link between the suction device and the hand-held power tool is established by means of the suction-device communication unit and the hand-held power tool communication unit. The suction-device communication unit in this case is a communication unit of the suction device, and the hand-held power tool communication unit is a communication unit of the hand-held power tool. In the context of the present disclosure, the communication unit of the suction device and/or of the hand-held power tool is designed to send and/or receive the communication signals. The communication signals may be transmitted by cable, via a wire connection or via conductor tracks on a printed circuit board, and/or the communication signals may be transmitted wirelessly. Wireless transmission of the communication signals in this case may be in the form of Bluetooth, WLAN, infrared, near-field communication (NFC) by means of RFID technology, as well as other means of wireless transmission of the communication signals familiar to persons skilled in the art. Communication protocols used in this case may be Bluetooth Smart, GSM, UMTS, LTE, ANT, ZigBee, LoRa, SigFox, NB-IoT, BLE, IrDA, as well as other communication protocols familiar to persons skilled in the art. The communication link may therefore be wireless or wired.

According to the disclosure, upon the suction device being switched on, the start signal is sent as the communication signal, by means of the communication link, from the suction device, in particular the suction-device communication unit, to the hand-held power tool, in particular the hand-held power tool communication unit. The start signal in this case may include information relating to operation of the suction device. When the hand-held power tool, in particular the hand-held power tool communication unit, receives the start signal as the communication signal, the hand-held power tool, in particular the drive unit, can be activated. In particular, a user cannot put the hand-held power tool into operation until the hand-held power tool communication unit has received the start signal from the suction device.

By means of a manual switch of a signal generator unit of the hand-held power tool, at least one actuation signal is generated and transmitted to a signal processing unit of the hand-held power tool. The hand-held power tool housing in this case at least partially accommodates the manual switch, the signal generator unit and the signal processing unit. The manual switch is designed to be actuated by the user in order to put the drive unit into operation. When the hand control is actuated, the actuation signal is generated and transmitted to the signal processing unit. The actuation signal in this case comprises at least information relating to actuation of the manual switch by the user. The signal generator unit in this case comprises at least the manual switch, and is designed to generate signals for controlling the hand-held power tool by open-loop and/or closed-loop control. In addition, the signal generator unit is designed to transmit at least the actuation signal to the signal processing unit. The transmission of the actuation signal between the signal generator unit and the signal processing unit may in this case be wire-bound, line-bound, by means of printed conductors on at least one printed circuit board, or wirelessly. The signal processing unit is designed at least to receive and process the actuation signal.

The actuation signal is transmitted, as the communication signal, to the suction device. After the signal processing unit has received the actuation signal from the signal generator unit, the signal processing unit transmits the actuation signal to the hand-held power tool communication unit. This transmission may be wire-bound, line-bound, by means of printed conductors on at least one printed circuit board, or wireless. The hand-held power tool communication unit transmits the actuation signal as a communication signal, by means of the communication link, to the suction device, in particular to the suction-device communication unit.

By means of a signal generator element of the signal generator unit, at least one connection signal from the hand-held power tool and the suction device is acquired and transmitted to the signal processing unit. In particular, the signal generator element checks a state connection of at least one part of the suction device, in particular the suction hose, very particularly a suction sleeve of the suction hose, to the hand-held power tool, in particular a connection element for the suction device.

The state of connection in this case may be "connected to the suction device" or "not connected to the suction device". The signal generator element then transmits the connection signal to the signal processing unit. The transmission of the connection signal between the signal generator element, in particular the signal generator unit, and the signal processing unit may in this case be effected as described above. The signal processing unit receives the connection signal and processes it further. The signal processing unit also transmits the connection signal to the hand-held power tool communication unit.

The connection signal is transmitted as the communication signal to the suction device. In particular, the hand-held power tool communication unit receives the connection signal and converts it into the communication signal. The hand-held power tool communication unit then transmits the communication signal, by means of the communication link, to the suction device, in particular to the suction-device communication unit.

The suction device, in particular the suction-device communication unit, receives the communication signal. In addition, the suction-device communication unit processes the communication signal and can transmit it to at least one suction-device control unit. The suction-device control unit is designed to control the suction device by open-loop and/or closed-loop control. The transmission of the communication signal from the suction-device communication unit to the suction-device control unit may be effected by wire, by cable, by means of printed conductors on at least one printed circuit board, or wirelessly.

A suction-device drive unit is switched on if the communication signal includes the actuation signal and the connection signal. In particular, the suction-device drive unit is switched on if the connection signal has the state of connection "connected to the suction device". The suction-device control unit may evaluate the communication signal and then effect open-loop and/or closed-loop control of the suction-device drive unit. If the connection signal comprises the state of connection "not connected to the suction device", no further action is effected and the suction-device drive unit remains out of operation.

After the suction-device drive unit has been switched on, the suction-device communication unit converts the communication signal into the start signal. Once the suction-device drive unit has been switched on, the suction-device control unit transmits the communication signal to the suction-device communication unit. By means of a microprocessor and/or microcontroller, the suction-device communication unit can convert the communication signal into the start signal. The suction-device communication unit transmits the start signal to the hand-held power tool, in particular the hand-held power tool communication unit, by means of the communication link. The hand-held power tool becomes activatable when the hand-held power tool communication unit receives the start signal.

By means of a sensor element of a sensor unit of the suction device, at least one test signal for testing a connection, in particular a mechanical connection, of the suction device to the hand-held power tool is generated, and converted into at least one control signal for controlling the suction device and/or the hand-held power tool. During operation of the hand-held power tool, the sensor element checks whether, after a predetermined period of time, the suction device, in particular the suction hose, very particularly the suction sleeve, continues to have the connection, in particular mechanical connection, to the hand-held power tool, in particular to the connection element for the suction device. The sensor element then generates the test signal, the test signal comprising at least one test state "connected to the hand-held power tool" or "not connected to the hand-held power tool". The sensor element converts the test signal into the control signal, for example by means of a microprocessor and/or a microcontroller. The sensor element then transmits the control signal to the suction-device control unit by wire, by cable, by means of printed conductors on at least one printed circuit board, or wirelessly.

In an alternative embodiment, it is conceivable for the sensor element to transmit the test signal to the suction-device control unit, and for the suction-device control unit to convert the test signal into the control signal.

The control signal is transmitted from the suction device, in particular the suction-device communication unit, to the hand-held power tool, in particular the hand-held power tool communication unit. The suction-device communication unit receives the control signal from the suction-device control unit and transmits it to the hand-held power tool, in particular the hand-held power tool communication unit, by means of the communication link. The hand-held power tool communication unit receives the control signal and transmits it to the signal processing unit.

The signal processing unit receives and processes the control signal and/or forwards it at least to a control unit of the hand-held power tool. The control unit controls the hand-held power tool by open-loop and/or closed loop control. In particular, the control unit controls the drive unit of the hand-held power tool by open-loop and/or closed loop control.

The suction device and the hand-held power tool, in particular the drive unit, are stopped if the control signal is a stop signal. The stop signal is generated on the basis of the test signal of the sensor element if the sensor element does not sense any, in particular mechanical, connection of the suction device, in particular the suction hose, most particularly the suction sleeve of the suction hose, to the hand-held power tool, in particular to the connection element for the suction device. The stop signal prevents further operation of the hand-held power tool if the suction device is not connected to the hand-held power tool, and thereby increases work safety.

The suction device and the hand-held power tool, in particular the drive unit, can still be operated if the control signal is an active signal. The sensor element generates the active signal as a test signal if the sensor element senses the, in particular mechanical, connection. Further operation of the hand-held power tool, with direct extraction of generated dust and/or dirt particles, is thereby ensured.

In one design according to the disclosure, a system for executing a method is proposed, wherein the system comprises at least one suction device and at least one hand-held power tool. The suction device has at least one suction-device communication unit, and the hand-held power tool has at least one hand-held power tool communication unit. The suction-device communication unit and the hand-held power tool communication unit establish a communication link. As described at the beginning, the suction device comprises the suction-device housing. The suction-device communication unit is assigned to the suction-device housing and, in one embodiment, is arranged substantially within the suction-device housing. The hand-held power tool comprises the hand-held power tool housing, as described above. The hand-held power tool communication unit is arranged on the hand-held power tool housing and, in one embodiment, is accommodated substantially within the hand-held power tool housing. It is also conceivable for the hand-held power tool communication unit to be realized as an external module, in particular an external plug-in module, that can be connected to the hand-held power tool, in particular detachably.

In one embodiment, the hand-held power tool has a signal generator unit. The signal generator unit comprises at least one signal generator element and at least one manual switch for generating an actuation signal. The hand-held power tool has a signal processing unit. The signal processing unit is designed to receive, process and/or forward at least signals from at least the signal generator unit. The hand-held power tool housing may at least partially accommodate the signal generator unit, in particular the manual switch and/or the signal generator element. The manual switch is arranged on the hand-held power tool housing in such a manner that it can be operated by the user with at least one hand, in particular with a finger of the user's hand. The signal processing unit may be a microprocessor and/or a microcontroller for receiving, processing and/or forwarding the signals such as, for example, the actuation signal.

In one embodiment, the suction device has a sensor unit having at least one sensor element for generating a test signal. The sensor unit may be assigned, for example, to the suction hose of the suction device. In a preferred embodiment, a suction sleeve of the suction hose comprises the sensor element, with the sensor element being arranged on the suction sleeve. The sensor element may generate the test signal by checking a connection, in particular a mechanical connection, of the suction device, in particular the suction hose, very particularly the suction sleeve of the suction hose, and the hand-held power tool, in particular a connection element for the suction device. As described above, the test signal comprises information relating to connection between the suction device and the hand-held power tool.

In one embodiment, the sensor element is a mechanical sensor element. The mechanical sensor element in this case may be realized as a mechanical switch for generating electrical signals.

In a next embodiment, the sensor element is an electrical sensor element. The electrical sensor element in this case may comprise at least one coil and/or at least one antenna to generate electrical signals. A capacitive sensor board, for example, may be used for this purpose. The capacitive sensor board may measure a change in a dielectric constant and compare it with a stored reference value. The capacitive sensor board may sense the change in the dielectric constant and use this to detect whether the, in particular mechanical, connection of the suction device to the hand-held power tool is realized. It is also conceivable for locally generated electric fields to be sensed by means of the coil and the antenna in order to detect the, in particular mechanical, connection of the suction hose to the hand-held power tool. Alternatively, it is also conceivable for the suction hose to establish an electrical contact connection to the hand-held power tool.

In a further embodiment, the sensor element is an optical sensor element. The optical sensor element may be realized as an optical switch by means of, for example, at least one light source such as, for example, an LED, at least one light barrier and/or at least one light-sensitive sensor such as, for example, a photodiode.

In one embodiment, the signal generator element is arranged on at least one part, in particular at least one suction-device connection element, of the hand-held power tool. In this embodiment, the part of the hand-held power tool, in particular the suction-device connection element, is realized as at least one connection sleeve for the suction device. The connection sleeve may in this case receive the suction hose, in particular the suction sleeve, and establish a mechanical connection. The mechanical connection of the suction hose to the connection sleeve enables generated dust and/or dirt particles to be removed from at least the work surface and to be directly extracted by the suction device.

In a further embodiment, the signal generator element is arranged on at least one part, in particular a suction-device connection element, of an accessory of the hand-held power tool. The accessory can be mechanically and/or electrically connected to the hand-held power tool. The accessory may be, for example, a suction module for a hammer drill. Further, the accessory may be such that it can be mechanically connected, in particular coupled, to the hand-held power tool in order to establish a mechanical connection between the accessory and the hand-held power tool. In addition, the accessory may also establish an electrical connection to the hand-held power tool, such that the accessory is supplied with power via the hand-held power tool power supply unit. It is also conceivable for the accessory to have an accessory power supply unit for an independent power supply. The accessory is realized in such a manner that it removes dust and/or dirt particles, generated during operation of the hand-held power tool, directly and immediately from at least the work surface. For further removal of the generated dust and/or dirt particles, the accessory has a connection sleeve as the at least one part of the accessory, in particular of the suction-device connection element, such that the suction hose, in particular the suction sleeve, can establish a mechanical connection by means of the connection sleeve. In this embodiment, the signal generator element is arranged on the suction-device connection element, in particular the connection sleeve.

In one embodiment, the signal generator element is a mechanical signal generator element. The mechanical signal generator element in this case may be realized as a mechanical switch for generating electrical signals.

In a next embodiment, the signal generator element is an electrical signal generator element. In this case, the electrical signal generator element may comprise at least one coil and/or at least one antenna to generate electrical signals. A capacitive sensor board, for example, may be used for this purpose. The capacitive sensor board may measure a change in a dielectric constant, compare it with a stored reference value and thereby generate the connection signal. The capacitive sensor board may detect the change in the dielectric constant and use this to detect whether the hand-held power tool is connected to the suction device. It is also conceivable for locally generated electric fields to be sensed by means of the coil and the antenna in order to check whether the hand-held power tool is connected to the suction device. Alternatively, it is also conceivable for the suction device to establish an electrical contact connection to the hand-held power tool.

In a further embodiment, the signal generator element is an optical signal generator element. The optical signal generator element may be realized as an optical switch by means of, for example, at least one light source such as, for example, an LED, at least one light barrier and/or at least one light-sensitive sensor such as, for example, a photodiode.

BRIEF DESCRIPTION OF THE DRAWINGS

The disclosure is explained below on the basis of preferred embodiments. In the following, the drawings show.

DETAILED DESCRIPTION

Figure 1:
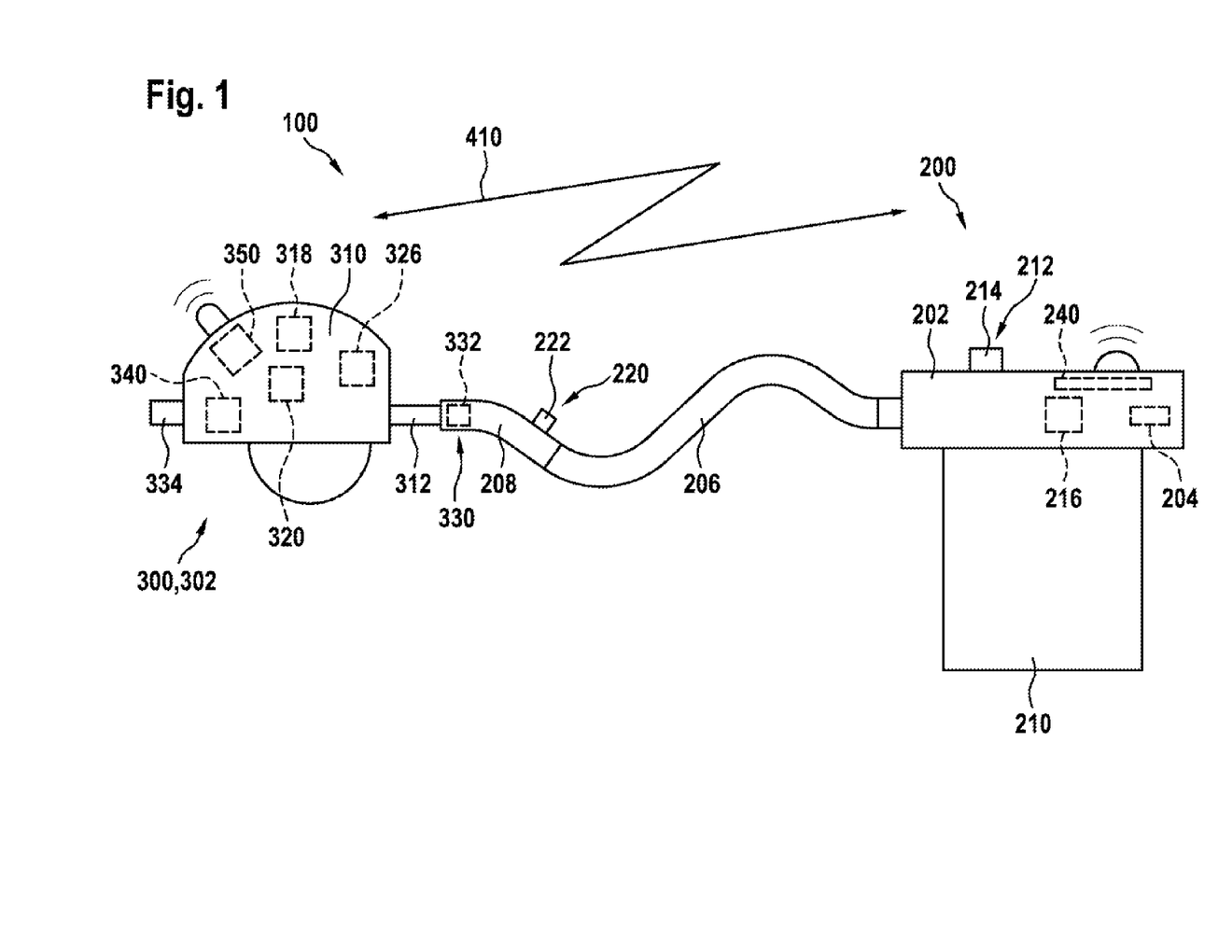
FIG. 1 a schematic view of a system according to the disclosure comprising a hand-held power tool and a suction device.

Shown in FIG. 1 is a schematic view of a system 100 according to the disclosure comprising a hand-held power tool 300 and a suction device 200. In this embodiment, the hand-held power tool 300 is realized, by way of example, as a hand-held circular saw 302. The hand-held power tool 300 is preferably a battery-operated hand-held power tool. It is to be noted that the present disclosure is not limited to battery-operated hand-held power tools, but may also be applied in the case of mains-operated or pneumatically operated hand-held power tools that have a suction-device connection element 312, 314. In a first embodiment of the disclosure, the suction-device connection element 312 is directly and immediately connected to a hand-held power tool housing 310.

The suction device 200 comprises a suction-device housing 202, a suction-device power supply 204, a suction hose 206 and a dust collection device 210. Furthermore, the suction-device housing 202 comprises a suction-device operating unit 212. The suction-device operating unit 212 in this case has a suction-device operating element 214, by means of which the suction device 200 is operated by a user and generates switching signals. The switching signals control a suction-device drive unit 216 by open-loop and/or closed loop control. The suction-device operating element 214 is realized as a main switch. The main switch switches the suction-device drive unit 216 on and off. The suction-device power supply unit 204 supplies electrical power to the suction device 200 and, in this embodiment, is realized as a battery-operated suction device 200. The battery-operated suction device 200 is supplied with electrical power by means of a hand-held power tool battery pack. The hand-held power tool battery pack is not represented in greater detail. The suction hose 206 comprises a suction opening and can be detachably attached to the suction-device housing 202. The suction hose 206 is detachably connectable to a suction-device connection element 312 of the hand-held power tool 100 by means of a suction sleeve 208.

In this embodiment, the suction device 200 comprises a sensor unit 220 that has a sensor element 222. The sensor element 222 can generate a test signal. Here, the sensor unit 220 is arranged on the suction hose 206 and the sensor element 222 is connected to the suction sleeve 208. The test signal comprises connection information about whether the suction sleeve 208 has a mechanical connection to the suction-device connection element 312.

The suction device 200 further comprises a suction-device communication unit 240. The suction-device communication unit 240 is designed to establish a communication link 410 with the hand-held power tool 300. In addition, the suction-device communication unit 240 is arranged in the suction-device housing 202.

The hand-held power tool 300 includes the hand-held power tool housing 310, a drive unit 320, and a hand-held power tool power supply unit 326. The hand-held power tool housing 310 accommodates the drive unit 320, the drive unit 320 being designed to drive the hand-held power tool 300. The hand-held power tool power supply unit 326 supplies electrical power to the hand-held power tool 300 via the hand-held power tool battery pack. The hand-held power tool battery is not shown in greater detail in this case. In addition, the hand-held power tool 300 comprises a control unit 318 for controlling the drive unit 320 by open-loop and/or closed loop control.

In this embodiment, the hand-held power tool 300 comprises a signal generator unit 330. The signal generator unit 330 comprises a signal generator element 332 and a manual switch 334. The manual switch 334 generates an actuation signal when a user actuates the hand switch 334. The signal generator element 332 is arranged on the suction-device connection element 312. In this embodiment, the suction-device connection element 312 is formed as a connection sleeve for the suction device 200. Further, the hand-held power tool 300 comprises a signal processing unit 340 for processing signals. In this embodiment, the signal processing unit 340 receives, processes and/or forwards the signals.

The hand-held power tool 300 further comprises a hand-held power tool 300 communication unit 350 for establishing the communication link 410 with the suction-device communication unit 240. The hand-held power tool 300 communication unit 350 is accommodated by the hand-held power tool 300 housing 310.

Figure 2:
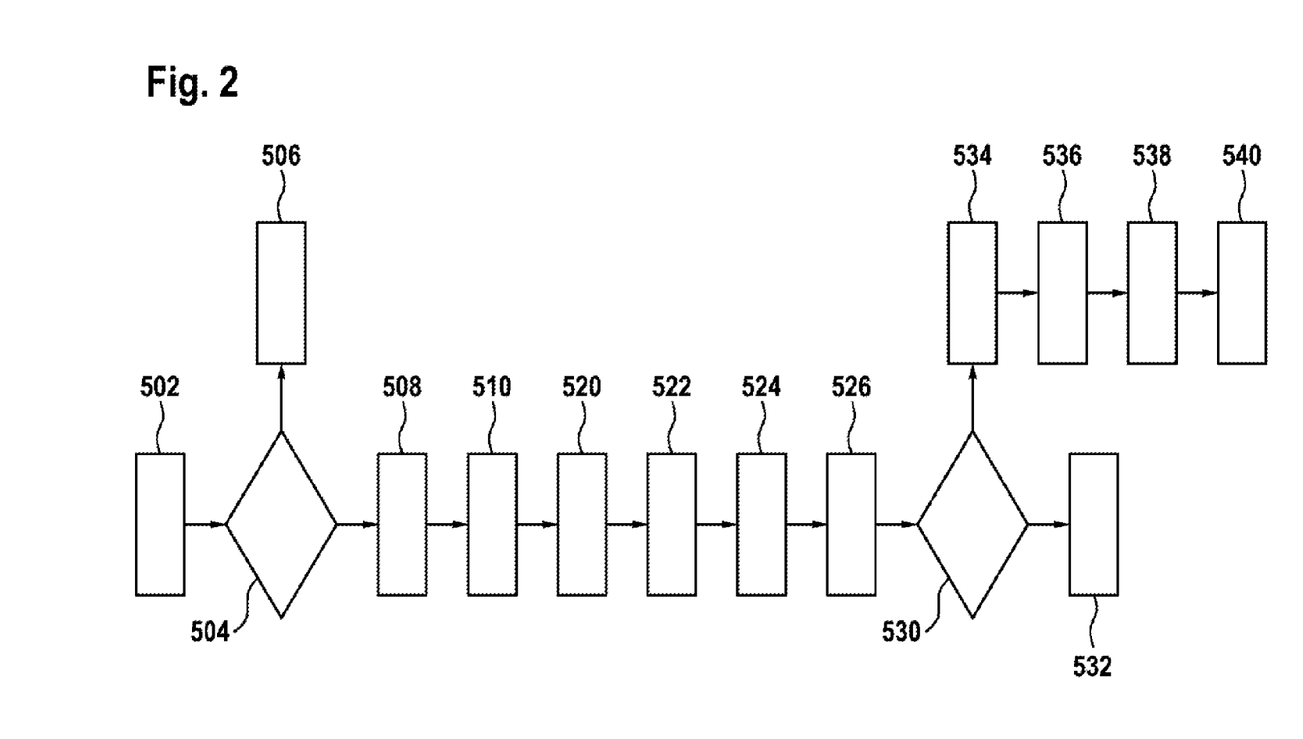
FIG. 2 a flow diagram of a method according to the disclosure for operating the system according to the disclosure.

FIG. 2 shows a flow diagram of a method of operating the system 100 according to the disclosure. In a method step 520, the suction device 200 is switched on. In a method step 522, a start signal is sent to the hand-held power tool 300 by means of the communication link 410. In this case, the suction-device communication unit 240 sends the start signal to the hand-held power tool 300 communication unit 350. In a method step 524, the hand-held power tool 300 communication unit 350 receives the start signal. In a method step 526, the hand-held power tool 300 can be activated, and the hand-held power tool 300 can be put into operation in the method step 526.

In a method step 502, the user actuates the manual switch 334 of the signal generator unit 330 of the hand-held power tool 300. This generates an actuation signal and sends it to the signal processing unit 340 of the hand-held power tool 300.

In a method step 504, a connection signal from the hand-held power tool 300 and the suction device 200 is acquired by means of the signal generator element 332 of the signal generator unit 330. The signal generator element 332 in this case detects whether the suction-device connection element 312, 314 and the suction sleeve 208 of the suction hose 206 are connected to each other. The connection signal is then transmitted to the signal processing unit 340.

If the signal generator element 332 cannot detect a connection of the suction-device connection element 312, 314 to the suction sleeve 208, no further action occurs in a method step 506, and the hand-held power tool 300 remains out of operation.

If the signal generator element 332 detects a connection of the suction device connection element 312, 314 to the suction sleeve 208, in a method step 508 the actuation signal and the connection signal are transmitted, as the communication signal, to the suction device 200. For this purpose, the signal processing unit 340 sends the actuation signal and the connection signal to the hand-held power tool 300 communication unit 350, which sends the actuation signal and the connection signal, as the communication signal, to the suction-device communication unit 240.

In a method step 510, the suction-device communication unit 240 receives the communication signal. The suction-device communication unit 240 processes the communication signal, the suction device drive unit 216 being switched on if the communication signal include the actuation signal and the connection signal. In particular, the suction-device drive unit 216 is switched on if the actuation signal and the connection signal are included in the communication signal.

Further, the suction-device communication unit 240 converts the communication signal into the start signal as soon as the suction-device drive unit 216 has been switched on in the method step 520. The start signal is then transmitted to the hand-held power tool 300 in the method step 522.

In a method step 530, a test signal is generated by means of the sensor element 222 of the sensor unit 220 of the suction device 200. The sensor element 222 checks whether, following the activation of the hand-held power tool 300, there is still a mechanical connection of the suction device 200, in this embodiment the suction sleeve 208, to the hand-held power tool 300, in this embodiment the suction-device connection element 312. The sensor element 222 then converts the test signal into a control signal for controlling the suction device 200 and the hand-held power tool 300.

If the mechanical connection of the suction device 200 and the hand-held power tool is still present, no further action is effected in a method step 532, and the hand-held power tool 300 can still be used with the suction device 200.

If, following the activation of the hand-held power tool 300, there is no mechanical connection of the suction device 200 to the hand-held power tool 300, the suction-device drive unit 216 is switched off in a method step 534. The control signal is then transmitted from the sensor unit 220 to the suction-device communication unit 240. In a method step 536, the suction-device communication unit 240 transmits the control signal to the hand-held power tool communication unit 350 by means of the communication link 410. In a method step 538, the hand-held power tool communication unit 350 receives the control signal and then transmits it to the signal processing unit 340. The control signal is then received by the signal processing unit 340, processed and transmitted to the control unit 318 of the hand-held power tool 300. In a method step 540, the control unit 318 controls the drive unit 320 by open-loop and/or closed loop control, and stops it in the absence of a mechanical connection of the suction sleeve 208 to the suction-device connection element 312.

Figure 3:
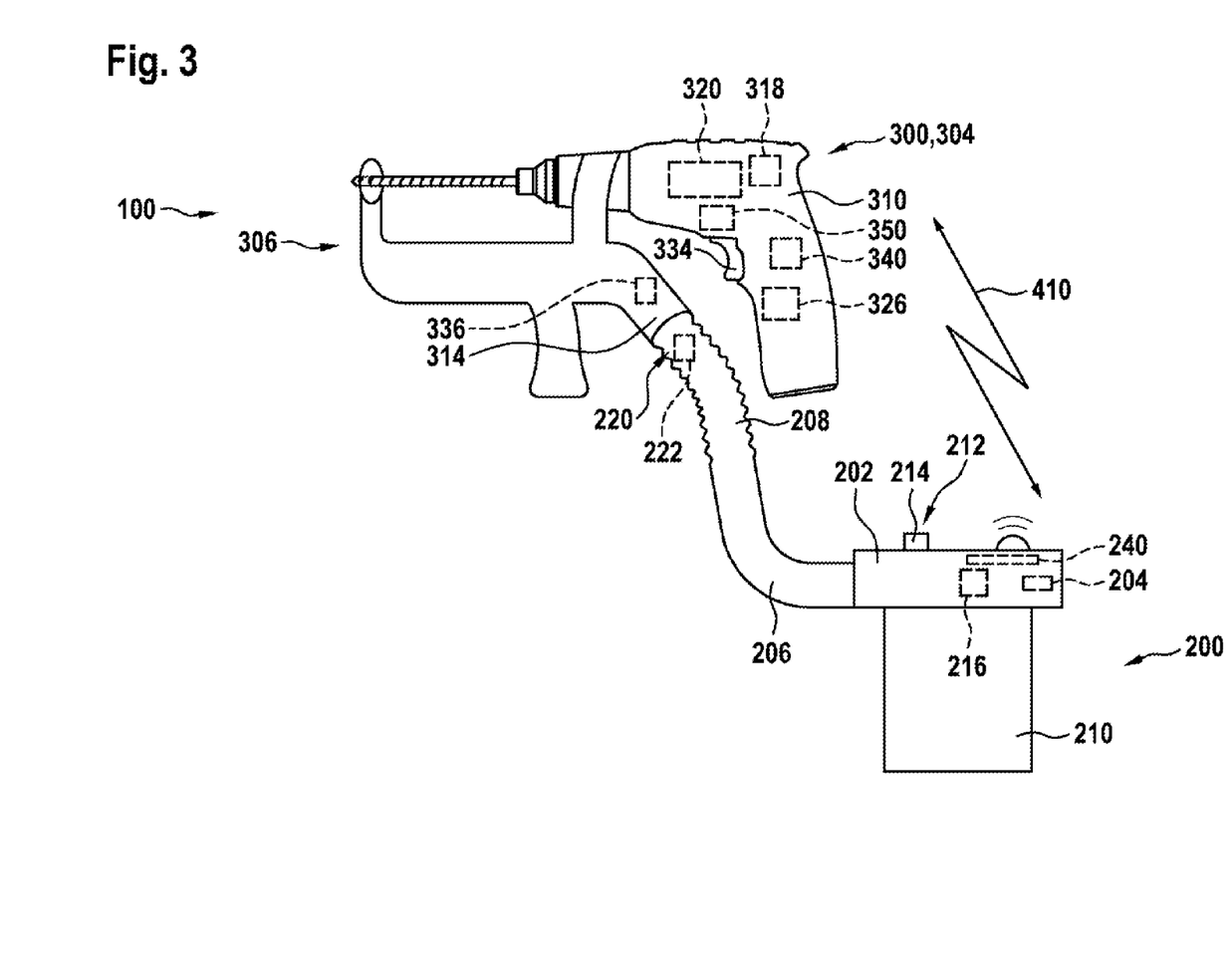
FIG. 3 a schematic view of the system according to the disclosure comprising the hand-held power tool, a connected accessory for the hand-held power tool, and the suction device.
Figure 4A:
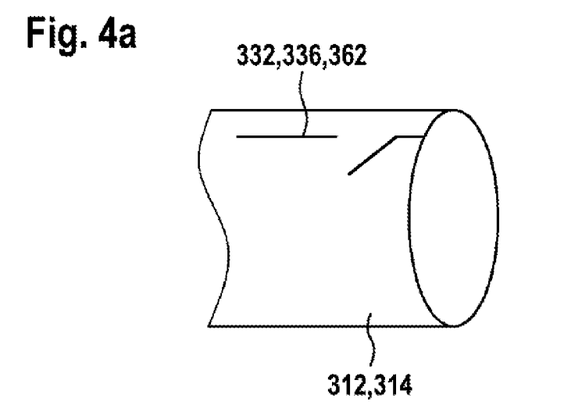
FIG. 4a a schematic detail of a mechanical signal generator element.
Figure 4B:
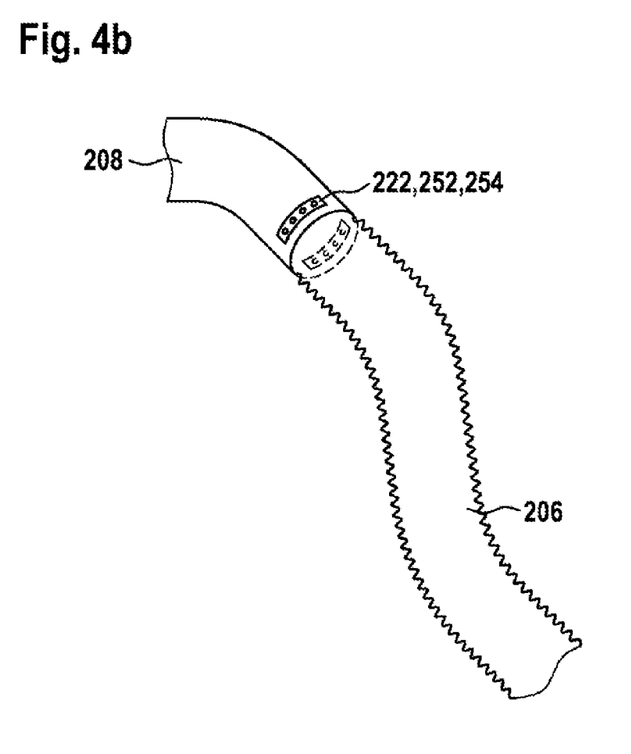
FIG. 4b a schematic detail of an electrical sensor element.
Figure 4C:
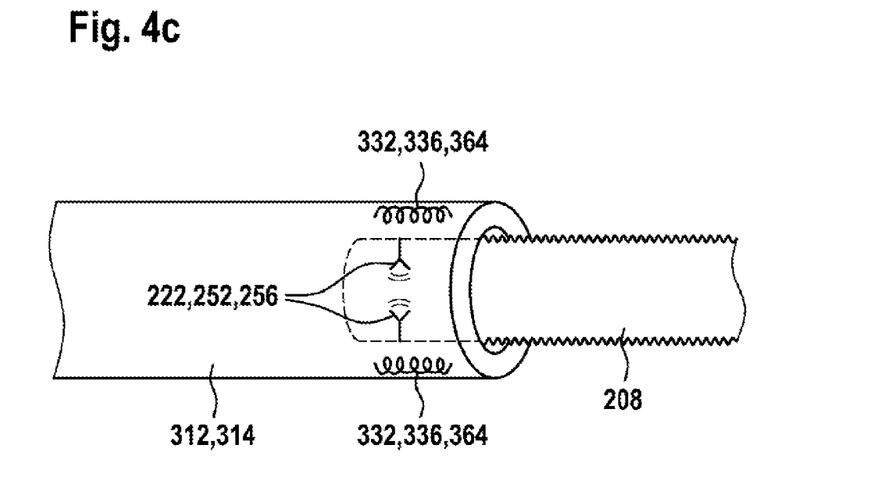
FIG. 4c a schematic detail of an electrical signal generator element and of an electrical sensor element.
Figure 4D:
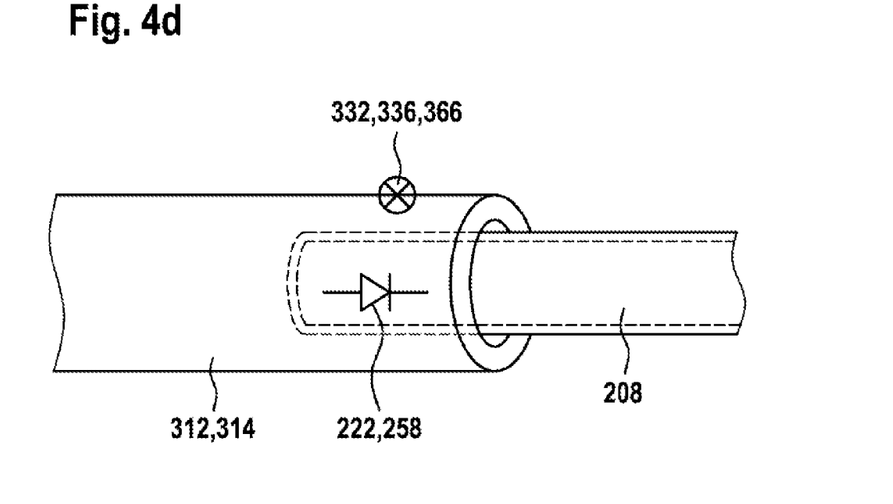
FIG. 4d a schematic detail of an optical signal generator element and of an optical sensor element.

Represented in FIG. 3 is a second embodiment of the disclosure. In the second embodiment, the hand-held power tool 300 is realized, by way of example, as a hammer drill 304. Further, in the second embodiment, the hand-held power tool 300 has an accessory 306, in this case an extraction module, for extracting dust. The accessory 306 can be electrically and mechanically connected in a detachable manner to the hand-held power tool 300 of the second embodiment. By means of the electrical connection to the hand-held power tool 300, the accessory 306 is supplied with electrical power via the hand-held power tool power supply unit 326. The accessory 306 has a suction-device connection element 314, in this embodiment a connection sleeve for the suction device 200. In this case, the suction-device connection element 314 can be detachably connected to the suction sleeve 208 of the suction device 200. Further, in the second embodiment, the accessory 306 has a signal generator element 336. The method steps described in FIG. 2 can also be executed analogously for the second embodiment, with the difference that the signal generator element 336 detects the connection signal with the suction sleeve 208 and transmits it to the signal processing unit 340.

FIG. 4 shows embodiments of the signal generator element 332, 336 and of the sensor element 222. Represented in FIG. 4a is an embodiment of the signal generator element 332, 336 as a mechanical signal generator element 362. In this case, the mechanical signal generator element 362 is in the form of a mechanical switch for generating electrical signals. FIG. 4b shows the sensor element 222 as an electrical sensor element 252. In this case, the electrical sensor element 252 is a capacitive sensor board 254. The capacitive sensor board 254 measures changes in a dielectric constant and compares this with a stored reference value. This allows the suction device 200 to detect whether the mechanical connection of the suction device 200 to the hand-held power tool 300 has been established. FIG. 4c shows a further embodiment of the electrical sensor element 252, as well as an embodiment of the signal generator element 332, 336 as an electrical signal generator element 364. In FIG. 4c, the electrical sensor element 252 is in the form of an antenna 256, whereas the electrical signal generator element 364 is realized as a coil. Represented in FIG. 4d is an embodiment of the signal generator element 332, 336 as an optical signal generator element 366. In this embodiment, the optical signal generator element 366 is realized as a light source, in this case an LED. In this embodiment, the sensor element 222 is an optical sensor element 258. Here, the optical sensor element 258 is in the form of a light-sensitive sensor, for example a photodiode.

The invention claimed is:

1. A method for operating a system having at least one suction device and at least one hand-held power tool, the method comprising:
    establishing a communication link between the suction device and the hand-held power tool with at least one suction-device communication unit and at least one hand-held power tool communication unit;
    transmitting at least one communication signal via the communication link from the hand-held power tool to the suction device;
    in response to the suction device being switched on, sending at least one start signal to the hand-held power tool; and
    activating the hand-held power tool only if the start signal is received by the hand-held power tool.

2. The method as claimed in claim 1, further comprising:
    generating at least one actuation signal with a manual switch of a signal generator unit of the hand-held power tool;
    transmitting the at least one actuation signal to a signal processing unit of the hand-held power tool; and
    transmitting the at least one actuation signal, as a first signal of the at least one communication signal, to the suction device.

3. The method as claimed in claim 2, further comprising:
    acquiring at least one connection signal from the hand-held power tool and the suction device via a signal generator element of the signal generator unit;
    transmitting the at least one connection signal to the signal processing unit; and
    transmitting the at least one connection signal, as a second signal of the at least one communication signal, to the suction device.

4. The method as claimed in claim 3, further comprising:
    receiving the at least one communication signal with the suction device;
    switching a suction-device drive unit on if the at least one communication signal includes the at least one actuation signal and the at least one connection signal; and
    after switching the suction-device drive unit on, converting the at least one communication signal into the start signal with the at least one suction-device communication unit.

5. The method as claimed in claim 1, further comprising:
    generating at least one test signal for testing a connection of the suction device to the hand-held power tool with a sensor element of a sensor unit of the suction device; and
    converting the at least one test signal into at least one control signal for controlling at least one of the suction device and the hand-held power tool.

6. The method as claimed in claim 5, further comprising:
    transmitting the control signal from the suction device to the hand-held power tool;
    with the signal processing unit, at least one of (i) receiving and processing the control signal, and (ii) forwarding the control signal to a control unit of the hand-held power tool; and controlling the hand-held power tool with the control unit using open-loop control or closed-loop control.

7. The method as claimed in claim 6, further comprising:
stopping the suction device and the hand-held power tool if the control signal is a stop signal; and
enabling operation of the suction device and the hand-held power tool if the control signal is an active signal.

8. The method as claimed in claim 7, wherein the stopping of the suction device and the hand-held power tool includes stopping a drive unit of the hand-held power tool, and the enabling operation of the suction device and the hand-held power tool includes enabling operation of the drive unit.

9. The method as claimed in claim 5, wherein the at least one test signal is for testing a mechanical connection of the suction device to the hand-held power tool.

10. The method as claimed in claim 1, wherein the transmitting of the at least one communication signal includes transmitting the at least one communication signal from the hand-held power tool communication unit to the at least one suction-device communication unit.

11. A system comprising:
at least one suction device comprising at least one suction-device communication unit; and
a hand-held power tool comprising at least one hand-held power tool communication unit,
wherein the at least one suction-device communication unit and the hand-held power tool communication unit are configured to establish a communication link and to transmit at least one communication signal via the communication link from the hand-held power tool to the suction device, and
wherein, in response to the suction device being switched on, the suction device is configured to send at least one start signal to the hand-held power tool and the hand-held power tool is configured to activate only if the start signal is received by the hand-held power tool.

12. The system as claimed in claim 11, the hand-held power tool further comprising:
a signal generator unit having at least one signal generator element and at least one manual switch configured to generate an actuation signal; and
a signal processing unit configured to at least one of receive, process, and forward signals from at least the signal generator unit.

13. The system as claimed in 12, the hand-held power tool further comprising at least one suction-device connection element, and the signal generator element is arranged on the at least one suction-device connection element.

14. The system as claimed in claim 12, wherein the signal generator element is arranged on an accessory of the hand-held power tool that is configured to be at least one of mechanically and electrically connected to the hand-held power tool.

15. The system as claimed in claim 14, wherein the signal generator element is arranged on a suction device connection element of the accessory.

16. The system as claimed in claim 12, wherein the signal generator element is a mechanical signal generator element.

17. The system as claimed in claim 12, wherein the signal generator element is an electrical signal generator element.

18. The system as claimed in claim 12, wherein the signal generator element is an optical signal generator element.

19. The system as claimed in claim 11, the suction device further comprising a sensor unit having at least one sensor element configured to generate a test signal.

* * * * *